June 6, 1944. N. G. BAKER 2,350,335
BREWER OR COOKER
Filed May 24, 1943 3 Sheets-Sheet 1
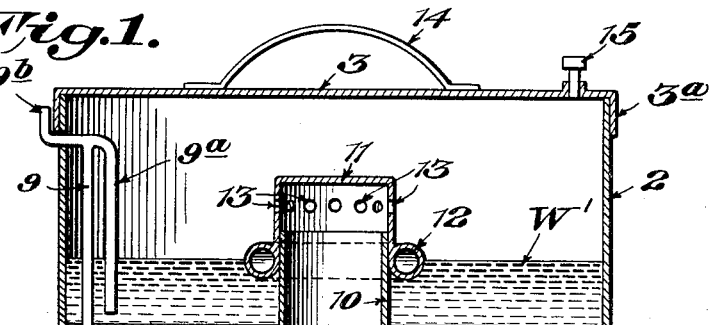
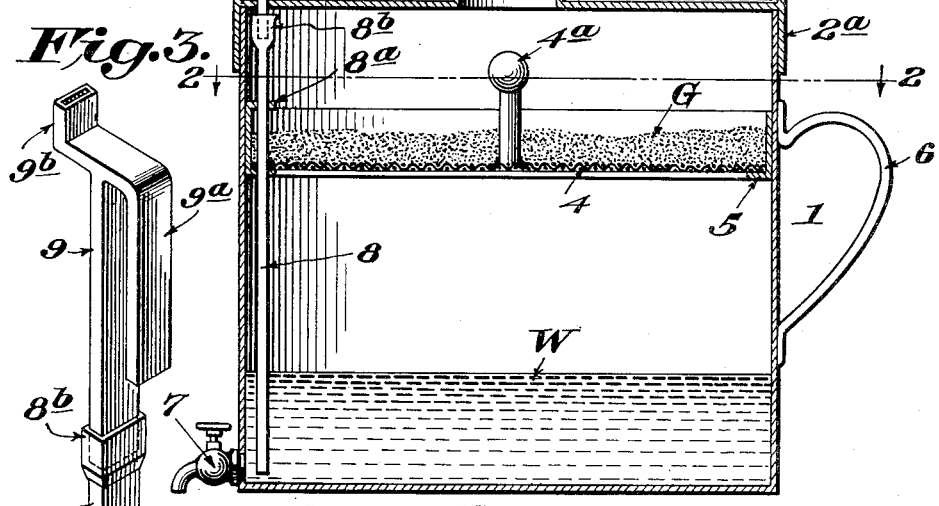
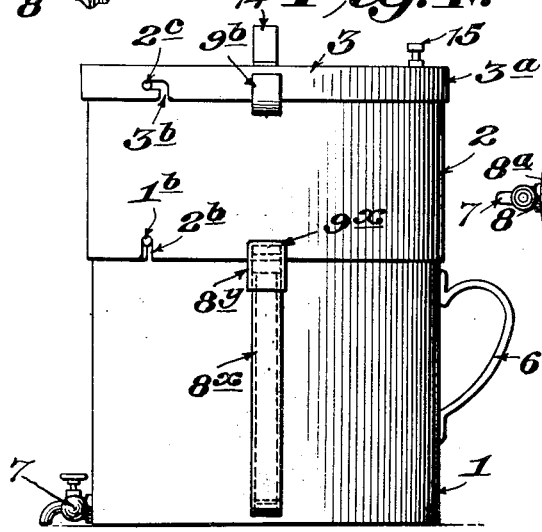
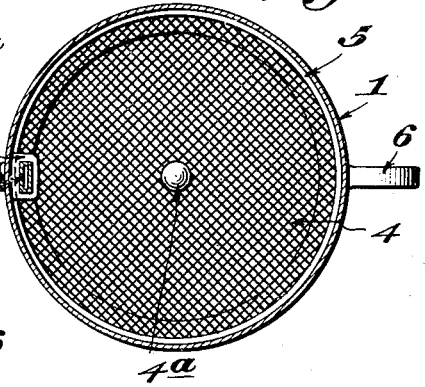

June 6, 1944.  N. G. BAKER  2,350,335
BREWER OR COOKER
Filed May 24, 1943  3 Sheets-Sheet 2
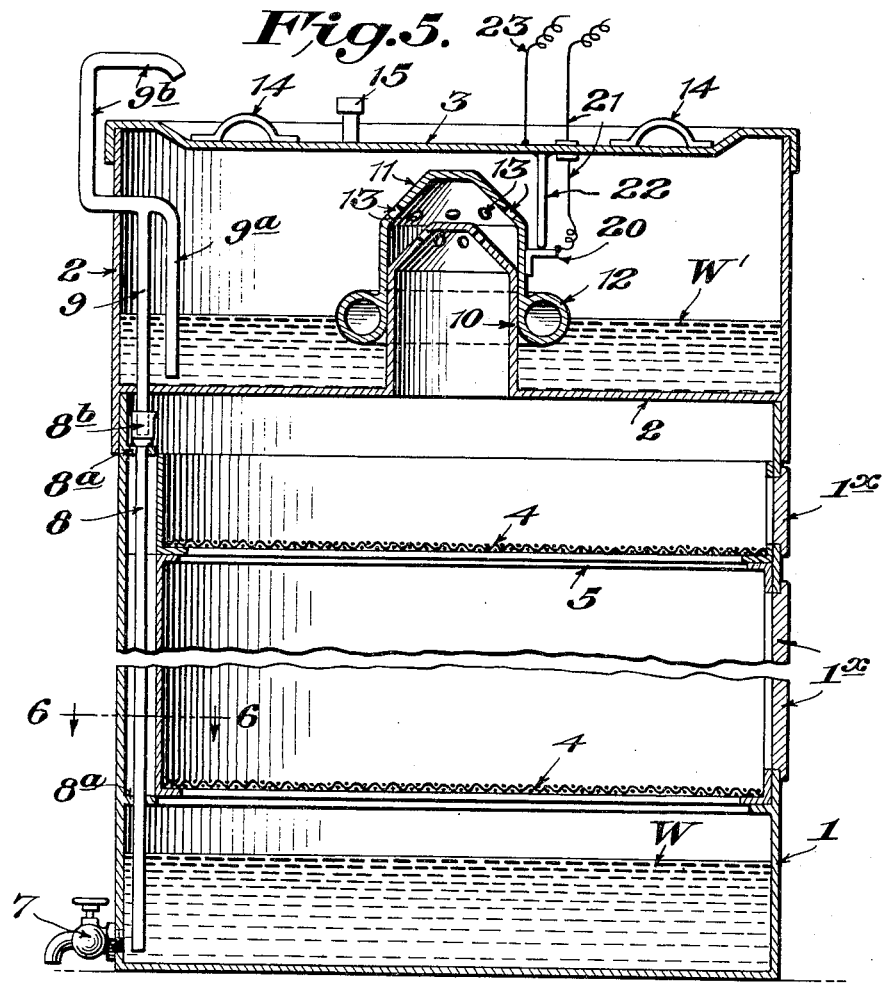
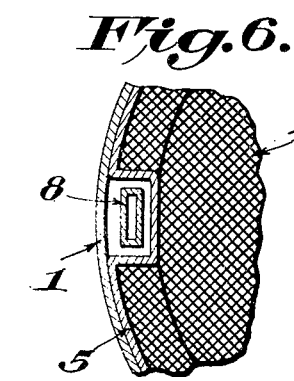
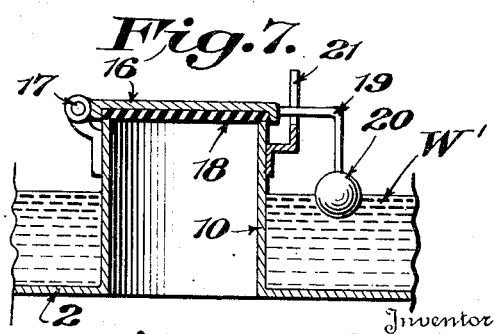
Inventor
Norman G. Baker
By Alexander & Dowell
Attorneys

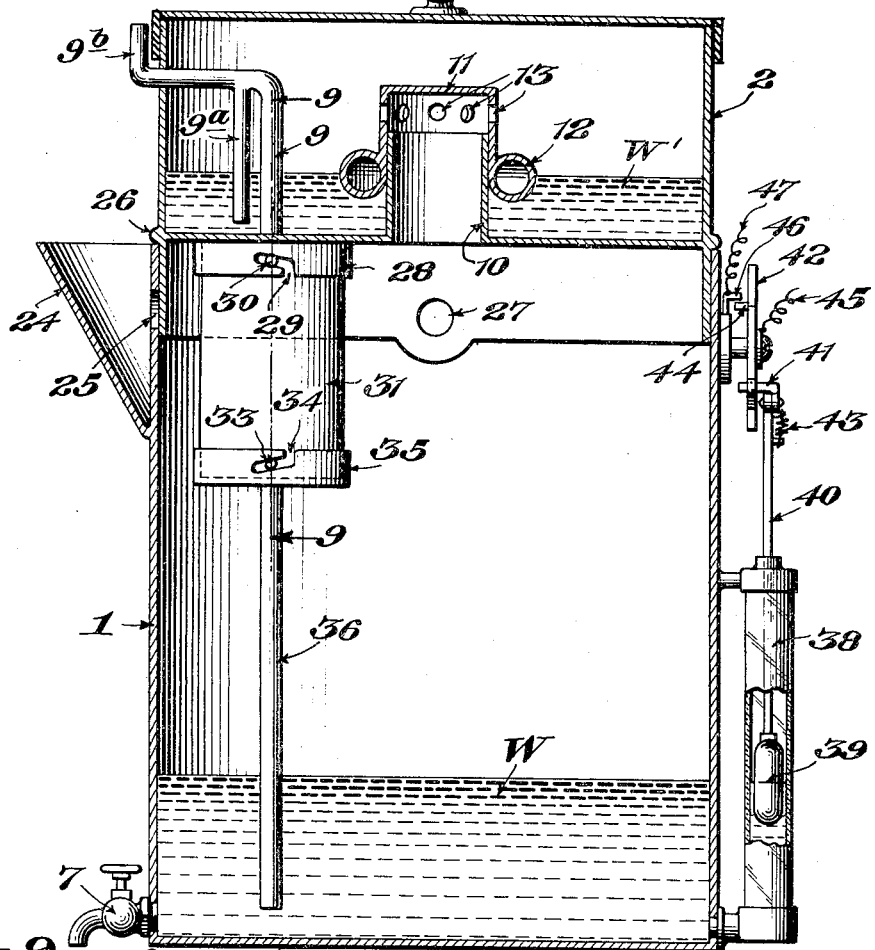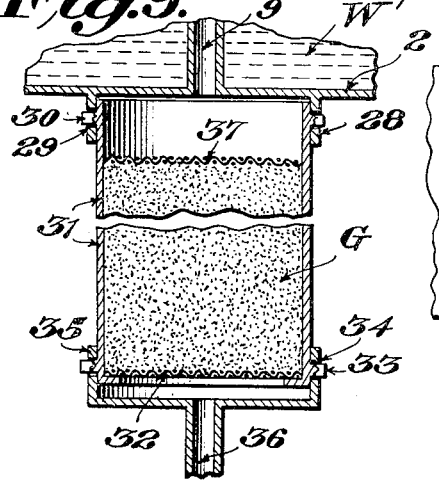

Patented June 6, 1944

2,350,335

UNITED STATES PATENT OFFICE 2,350,335

BREWER OR COOKER

Norman G. Baker, Laredo, Tex.

Application May 24, 1943, Serial No. 488,247

20 Claims. (Cl. 99—281)

This invention is a novel brewer, cooker or extractor for making various food extracts, the same being particularly adapted for cooking or preparing food products for home meals, the brewer, cooker or extractor operating under low steam pressure of approximately 1 ounce per square inch or less, steam being hotter than the boiling water now commonly used in such devices.

One object of the invention is to provide a brewer for making coffee, tea or other drinks, said brewer comprising superimposed sections, the lower section having a screen adapted to hold coffee grounds or other products to be brewed or extracted, and also containing a quantity of water; and the upper section containing a quantity of water and closing the open upper end of the lower section and containing a novel automatic steam valve, an inverted U-shaped overflow pipe connecting the upper and lower sections, the ends of the pipe branches terminating adjacent the bottoms of their respective sections, said steam valve including novel float means adapted to rise and fall with the quantity of water in the upper section to open and close said valve, whereby when heat is applied to the lower section steam will be generated therein which will rise upwardly through the coffee grounds and pass through the valve into the upper section, whereupon the slight steam pressure generated in the upper section will cause the water therein to flow through the overflow pipe down into the lower section, thus reducing the head of water in the upper section to such point that the valve will be closed until such time as steam pressure generated in the lower section will force the water therein in the reverse direction upwardly through the inverted U-shaped overflow pipe and into the upper section, whereupon the valve will open to admit steam therethrough from the lower section into the upper section, the process being thus repeated over and over again until the desired strength of the coffee is obtained.

While the steam generated in the lower section will lose some degree of heat when passing upwardly through the coffee grounds, the steam which is hotter than boiling water will extract the coffee essence from the grounds more quickly and thoroughly than previous extractors or brewers; and hence the use of my brewer operating on low pressure steam will make it possible to utilize less coffee grounds to obtain the same strength of the finished coffee. Moreover, since no water is passed through the coffee grounds, no "mud" or fine coffee dust will be present in the finished coffee collected in the bottom of the lower section, and the coffee obtained by my brewer will be a clear fluid of color or strength determined by the number of cycles of water transfer from the upper section to the lower section, the water transfer merely maintaining the steam flow through the coffee grounds and carrying the extracted coffee essence therefrom into water in the upper section where it is later delivered into the water in said lower section, the transfer being repeated over and over again.

Another object of the invention is to provide a novel food cooker operating upon substantially the same principles as the brewer above described, the lower section having a plurality of superimposed screens through which the low pressure steam passes, said trays being adapted to hold different articles of food from which essence is to be extracted.

A further object of the invention is to provide a cooker or brewer of the above type having devices adapted to electrically shut off the heat applied to the lower section according to a predetermined number of times the water transfer is repeated.

A further object of the invention is to provide a brewer or extractor of the above general types in which the coffee grounds or other food products from which essences are to be extracted are disposed in the inverted U-shaped overflow pipe connecting the upper and lower sections so that the boiling water along the steam is passed through the food products during water transfer in both directions.

Other minor objects of the invention will be hereinafter set forth.

I will explain the invention with reference to the accompanying drawings which illustrate several practical embodiments thereof to enable others familiar with the art to adopt and use the same; and will summarize in the claims the novel features of construction, and novel combinations of parts, for which protection is desired.

In said drawings:

Fig. 1 is a vertical section through one form of brewer for coffee, tea or other drinks.

Fig. 2 is a reduced horizontal section on the line 2—2, Fig. 1.

Fig. 3 is a perspective view of the inverted U-shaped overflow pipe, detached.

Fig. 4 is a reduced elevation of the brewer showing a modified arrangement of the overflow pipe.

Fig. 5 is a vertical section through a modified cooker for simultaneously extracting essences from various food products, and showing an electrical arrangement whereby the burner under the cooker may be automatically shut off.

Fig. 6 is an enlarged horizontal section on the line 6—6, Fig. 5.

Fig. 7 is a vertical section through a modified form of steam valve.

Fig. 8 is a vertical section showing a further modified form of brewer in which the coffee grounds or other food products are disposed in the overflow pipe so that the water will pass directly therethrough in its upward and downward flow, and also showing novel electrical devices for shutting off the burner after a predetermined number of water transfers.

Fig. 9 is an enlarged section on the line 9—9, Fig. 8.

Fig. 10 is an elevation of the ratchet wheel of the electrical devices shown in Fig. 8.

As shown in Figs. 1 to 3, the brewer, cooker or extractor is arranged to brew coffee, the same consisting of a lower section 1, an upper section 2, and a lid 3. Lower section 1 is open at its top, and within the same adjacent its upper end is a screen 4 (Figs. 1 and 2) upon which the coffee grounds G are placed, said screen 4 resting upon an annular ring 5 fixedly secured therein and having at its center an upstanding knob 4a whereby screen 4 may be lifted from the supporting ring 5 for cleaning or other purposes. Lower section 1 is also provided with a handle 6, and has a drain cock 7 adjacent its lower end through which the brewed coffee may be withdrawn. Within lower section 1 at one side is a vertically disposed overflow pipe 8 fixedly mounted in brackets 8a on the inner wall of said section, pipe 8 having its lower end terminating adjacent the bottom of section 1 and having its upper enlarged or flared as at 8b for the purpose hereinafter explained.

Upper section 2 is closed at the bottom and open at its top, and has an annular apron 2a extending from its lower periphery receiving the upper end of lower section 1 in such manner as to form a substantially steam-tight joint. Mounted in upper section 2 is an inverted U-shaped overflow pipe 9 (Figs. 1 and 3) having its longer leg extending through the bottom of upper section 1 is a fluid-tight manner and normally entering the enlarged or flared portion 8b of pipe 8 of lower section 1 so as to form a continuation of pipe 8. The shorter leg 9a of the inverted U-shaped pipe terminates adjacent the bottom of upper section 2. Air vent 9b may be provided adjacent the upper end of the pipe 9, said vent 9b extending outwardly through the side of upper section 2 and being upturned as indicated in Figs. 1-3. In order that section 2 may be properly positioned on section 1, so that pipe 9 will enter the enlargement 8b of pipe 8, I preferably provide a slot 2b (Fig. 4) in apron 2a of upper section 2 adapted to receive a pin 1b on the lower section 1 when the pipes 8 and 9 are in axial alignment so that said pipes will in effect form a single pipe when the sections 1 and 2 are thus assembled.

Adjacent the center of the bottom of section 2 is an upstanding collar 10 terminating at a point substantially half the height of section 2, and upon the collar 10 is a vertically slidable inverted cup-shaped valve 11 having an annular float chamber 12 at its lower end adapted to float upon the surface of the liquid in the upper section, said valve 11 having adjacent its upper end one or more perforations 13 through which steam may pass into the upper section from the lower section when the valve is raised by the water into position as shown in Fig. 1, but when the head of water in the upper section 2 is reduced the valve 11 will drop upon collar 10 into such position that the perforations 13 are closed by the collar 10, thereby shutting off the flow of steam from the lower section to the upper section.

Upon the top of upper section 2 is a lid 3 having an apron 3a receiving the upper end of section 2, apron 3a having one or more bayonet slots 3b (Fig. 4) therein receiving pins 2c on the section 2 to maintain lid 3 locked thereon. Lid 3 also carries a handle 14 whereby the lid may be readily removed and applied. Lid 3 is also provided with a safety valve 15 which may be a ball spring safety valve, or may comprise a whistle whereby if too much steam is generated in upper section 2 the operator will be audibly advised that he should turn down the flame under the brewer.

In operating the brewer shown in Figs. 1 to 3 with parts disassembled, the coffee grounds G or other products are placed upon screen 4 and the screen then inserted into bottom section 1 after first pouring a quantity of water W into said bottom section 1. Upper section 2 is then placed upon the bottom section with pipes 9 and 8 aligned as before mentioned, and a quantity of water W' is then poured into the upper section, the quantities of water poured into the top and bottom sections being preferably the combined amount to give the desired number of cups of finished coffee. Lid 3 is then placed upon the upper section 2 and locked by the pins 2c engaging the bayonet slots 3b. The brewer is then placed above a flame or other heating means. As the water W in lower section 1 begins to boil, steam rises upwardly through coffee grounds G on screen 4 and passes on through collar 10 and through the initially open valve ports 13 into the upper section 2, in which section the steam collects at a slight pressure of 1 ounce or less. As the steam pressure in upper section 1 increases the water W' in the upper section 3 is forced up through branch 9a of the inverted U-shaped overflow pipe 9 and down through aligned pipes 9 and 8 into lower section 1, the same mixing with the water W therein. At the same time the float valve 11 is lowered by loss of head of water in upper section 1 and valve 11 will continue to fall until the ports 13 thereof are positioned below the upper edge of collar 10, at which time the passage of steam from lower section 1 into upper section 2 through valve 11 is shut off leaving only a small amount of water W' in upper section 2. When valve 11 is thus closed steam pressure will collect in lower section 1, and as same increases the water W in lower section 1 will be forced back upwardly through the pipes 8 and 9 and down through branch 9a into the upper section 2, whereupon the valve 11 will rise with the increase in head of the water W' and the perforations 13 of valve 11 will again be opened to admit steam to again pass from lower section 1 into upper section 2, the steam pressure in the upper section again collecting until such point that the water W' in the upper section is again forced by pressure in the reverse direction upwardly through branch 9a and downwardly through the pipes 9 and 8 into the lower section. The cycle of water transfer will thus be automatically repeated over and over again until the desired strength of coffee is obtained.

The lower section 1 may be made of glass or metal. If made of metal the same may have a sight glass therein so that the operator can observe the color of the coffee, thus indicating the strength thereof.

Steam pressure of one ounce or less per square inch is hotter than boiling water. The steam from the boiling water in the bottom section will lose some degree of heat when passing upwardly through the coffee grounds G, but steam is always hotter than water and same will collect the coffee essence more quickly and more thoroughly than water, and thus my brewer will provide quicker coffee making and will require less coffee grounds for making the same strength of finished coffee. Also since no water can drain down through the grounds G no "mud" or fine coffee dust is collected with the essence in the water in the lower or upper sections, and thus my brewer will provide clear coffee color for the strength obtained after two, three or more cycles of water transfer, the water transfer maintaining a flow of steam through the coffee, which steam as it rises carries over with it the coffee essence and delivers same to the water W' in the upper section 2, which water W' is eventually carried over for the most part into the water W in the lower section 1 as the cycle of water transfer is repeated over and over again. The finished coffee may be eventually withdrawn with the water W from the brewer or extractor through the cock 7.

Instead of mounting the pipe 8 on the interior of lower section 1 the same may be mounted on the exterior thereof as shown at 8x (Fig. 4), the lower end of pipe 8x entering the lower section 1 at a point slightly above the bottom and the upper portion being flared or enlarged as at 8y to receive the lower end 9x of pipe 9 in the upper section 2 which projects through the side of the upper section 2 and is downturned to enter the enlargement 8y in substantially the same manner as shown in Figs. 1 and 3.

Instead of using the inverted cup-shaped valve 11 as shown in Fig. 1, a valve plate 16 (Fig. 7) may be hingedly connected as at 17 to the collar 10 and adapted to swing upwardly, said plate carrying on its underside a gasket 18, and having a lateral projection 19 at its side opposite from hinge 17 which is down-turned and carries a float 20, the horizontal portion of projection 19 operating between suitable guides 21, as shown in Fig. 7. By this construction the valve will be closed by gravity when the head of water W' is reduced to the extent shown in Fig. 7, but when the water level W' increases the float 20 will cause the valve 16 to swing upwardly to admit flow of steam from lower section 1 into upper section 2 in substantially the same manner as above described in connection with Figs. 1–4.

The air vent 9b could be omitted since steam pressure in the upper section 2 will force the water W' up the branch 9a and down through pipes 9 and 8 into lower section 1. However, if the air vent 9b is omitted the downwardly flowing water in pipes 9 and 8 would create a syphon action which would drain off the water W' from upper section 2 too quickly; also when water W is forced back from the lower section into the upper section 2 the bottom of pipe 8 would be opened when sufficient water W in the lower section 1 had passed upwardly into pipe 8, whereupon the stand of water in the pipe 8 would fall back down into the lower section 1, which falling would again create a syphon action which would drain the upper section 2 too suddenly to permit efficient steaming of the grounds G. I therefore prefer to use the vent 9b in overflow pipe 9 to prevent too sudden transfer of water from the upper section to the lower section and thus prolong the time of steaming of the grounds G during each cycle of water transfer.

In the modification shown in Figs. 5 and 6, the food cooker is generally similar to that shown in Figs. 1 to 3, and similar parts are similarly lettered. In this modification however a plurality of screens 4 are arranged in the bottom section 1 at different elevations, and preferably doors 1x are provided in the side of bottom section 1 opposite the screens 4 so that the food may be placed upon or removed from the screens without having to disassemble the sections 1, 2 and 3. Provision of doors moreover provides for the removal of foods which are more quickly cooked than others so that the foods which require longer cooking periods can remain in the cooker without having to disassemble the latter. Moreover, the doors if of glass would provide means for inspection of the food upon the screens 4. In this modification a meal can be steam cooked at one time using the heat of only one stove burner instead of having to use separate burners for each of the foods, thus saving unnecessary waste of fuel. The lid 3 if desired could be dished or hollow, as shown, to catch the blow-out water from the vent 9b.

The operation of the cooker shown in Figs. 5 and 6 is substantially identical with that above described in connection with Figs. 1 to 3, the cooker operating upon low pressure steam. The condensed steam in the upper section 2 carries with it the essence of the foods on each of the screens 4 and transfers same through pipes 9a, 9 and 8 into the lower section 1 to be used as a basis for soups or for heavy fluids containing the essence and strongest food values of the products placed upon the screen 4.

In this modification an electric contact 20 is provided on the float valve 11, said contact being connected by a conductor 21 to the magnetic or other control devices of the burner, contact 20 cooperating with a second contact 22 connected by conductor 23 to the magnetic or other control circuit so that when the float 11 rises with the head of water in upper section 2 the contact 20 and 21 will be engaged and the closed magnetic control circuit will turn down and cut off the burner, permitting use of an average lower burner blaze while the steam is passing through the collar 10. The contacts could be so arranged that the burner blaze would be cut down each time a predetermined amount of water was contained in the upper section 2; or the magnetic circuit could be arranged to cut off the burner to slow down the water transfer during part of the cycle.

In the modification shown in Figs. 8 to 10, the coffee grounds G or other food products are disposed in the overflow pipe so that the water being transferred from the upper to the lower compartment, or vice versa, will necessarily pass through the grounds. In this modification the lower section 1 is provided at the bottom with an outlet cock 7, and is provided at the upper end with a spout 24, an opening 25 being provided in the wall of the bottom section in way of spout 24. The upper section 2 is provided with a bead 26 adjacent its lower end and the walls of the section below the bead are arranged to fit within the walls of bottom section 1. In the lower portion of section 2 lying within the walls of the bottom section 1 is an opening 27 of same size as the opening 25 and so arranged that when the upper section is rotated on the lower section the openings 25 and 27 may be brought into register to permit the contents of the lower section of the brewer to be poured out through spout 24, when when the openings 25 and 27 are out of register the lower section will be substantially steamtight so as to permit the transfer of water from the upper to the lower section, and vice versa, as above described.

In the modification shown in Figs. 8–10 inclusive the inverted U-shaped pipe 9 has its longer leg extending through the bottom of the upper section, and adjacent the upper end of pipe 9 the air vent 9b is preferably provided as hereinbefore mentioned. The short leg 9a of the inverted overflow pipe terminates a short distance above the bottom of the upper compartment, as shown. On the underside of upper compartment 2 is a relatively large collar 28 having bayonet slots 29 therein adapted to receive pins 30 on the outer walls of the container 31 which is open at its upper and lower ends and carries a screen 32 adjacent its lower end upon which the coffee grounds G are placed. The bayonet slots provide for quick connection and disconnection of the container from the bottom of the upper section 1. At the lower end of container 31 is a second pair of pins 33 adapted to engage bayonet slots 34 in the enlarged head 35 of the pipe 36 which extends to a point adjacent the bottom of the lower section 1 in a manner similar to the pipe 8 in the preceding figures.

By the above construction the water transferred from the lower to the upper section, or vice versa, must necessarily pass through the grounds G in container 31, and the essence from the grounds is thereby extracted not only by the water but by the steam carried over therewith. The coffee after being brewed may be removed through the cock 7, or through the spout 24 when the openings 25 and 27 are brought into register. In order to prevent the grounds from being carried upwardly along with the water when passing upwardly through the container 31 an upper screen 37 is preferably placed in the container resting upon the top of the grounds G.

In this modification (Figs. 8–10 inclusive) a transparent water gauge 38 is mounted on the side of the lower section 1 and communicates at its lower end with the lower section adjacent the bottom thereof so that the water in gauge 38 will always stand at the same level as the water level W in the lower section. Within gauge 38 is a float 39 connected to a rod 40 extending upwardly through an opening in the top of the gauge. Rod 40 carries on its upper end a pivoted pawl 41 adapted to engage the teeth of a ratchet wheel 42, said wheel in the modification shown having six teeth. Pawl 41 is yieldably mounted on rod 40 by means of spring 43 so that on the upward movement of rod 40 the pawl will engage a tooth of the ratchet wheel and turn the ratchet wheel one tooth, but on the downward movement of the rod 40 the pawl will yield and ride over the following tooth. On the rear face of ratchet wheel 42 is a contact 44 connected through wheel 42 and conductor 45 in circuit with magnetic or other control devices of the burner. Cooperating with the contact 44 is a fixed contact 46 mounted on the side of section 1 and connected through conductor 47 in the magnetic or other control circuit.

By the above arrangement the ratchet wheel 42 may be set so as to bring its contact 44 into engagement with the fixed contact 46 after the ratchet wheel has been rotated through two, three, four or five successive movements corresponding to the number of times the water from the lower compartment 1 is transferred into the upper compartment 2, and thus the burner may be automatically shut off after a selected number of water transferring operations have been completed, since the ratchet wheel 42 is rotated only one notch each time the water from the upper section is transferred to the lower section through the pipes 9 and 39.

I do not limit my invention to the exact forms shown in the drawings, for obviously changes may be made therein within the scope of the claims.

The top section 2, Fig. 8, has a removable top lid with bayonet slot and pin, same as shown in Fig. 1, to permit cleaning.

I claim:

1. A brewer, cooker or extractor of the character specified, comprising a casing having a steam-tight lower section, and a superimposed steam-tight upper section, each section being adapted to hold a quantity of water in their lower portions; an inverted U-shaped overflow pipe having its ends respectively terminating adjacent the bottoms of the respective sections; a collar within the upper section extending upwardly from the bottom thereof to a point above the normal water level therein and communicating with the lower section; a valve on said collar adapted to be opened and closed by the rise and fall of water in the upper section; and means within the lower section for holding the products to be treated.

2. In a brewer as set forth in claim 1, said upper section having a removable lid; means for locking the lid on said upper section; and a relief valve on said lid.

3. In a brewer as set forth in claim 1, said overflow pipe being made in separable portions carried by the respective sections and adapted to interengage when the sections are superimposed.

4. In a brewer as set forth in claim 1, said valve comprising an inverted cup-shaped member slidably mounted on the said collar and carrying a float at its lower end; said member having perforations therein adjacent its upper end adapted to be closed by the walls of the collar when the valve is in lowered position.

5. In a brewer as set forth in claim 1, said valve comprising a plate hingedly mounted at the upper end of the collar, said plate having a downwardly turned arm at its edge opposite from the hinge, said arm carrying a float.

6. In a brewer as set forth in claim 1, said product holding means comprising one or more screens disposed within the lower section.

7. In a brewer as set forth in claim 1, said product holding means comprising a container removably disposed in the overflow pipe within the lower section, said container being open at each end; and screens within the container between which the product is confined.

8. In a brewer as set forth in claim 1, said overflow pipe having a vent to atmosphere at the upper end thereof.

9. A brewer, cooker or extractor of the character specified, comprising a casing having a steam-tight lower section, and a superimposed steam-tight upper section, each section being adapted to hold a quantity of water in their lower portions; an inverted U-shaped overflow pipe having its ends respectively terminating adjacent the bottoms of the respective sections; a collar within the upper section extending upwardly from the bottom thereof to a point above the normal water level therein and communicating with the lower section; a valve on said collar adapted to be opened and closed by the rise and fall of water in the upper section; means within the lower section for holding the products to be extracted; said lower section having a spout on its side communicating with the interior thereof, and said upper section having an apron overlapping the lower section and normally closing communication between the spout and interior of the lower section; said apron having an opening adapted in one position of the upper section on the lower section to establish communication therebetween.

10. In a brewer as set forth in claim 9, said valve comprising an inverted cup-shaped member slidably mounted on the said collar and carrying a float at its lower end; said member having perforations therein adjacent its upper end adapted to be closed by the walls of the collar when the valve is in lowered position.

11. In a brewer as set forth in claim 9, said product holding means comprising a container removably disposed in the overflow pipe within the lower section, said container being open at each end; and screens within the container between which the product is confined.

12. In a brewer as set forth in claim 9, said overflow pipe having a vent to atmosphere at the upper end thereof.

13. A low pressure steam brewer, cooker or extractor of the character specified adapted to be heated by a heater having electric control devices, comprising a casing having a steam-tight lower section, and a superimposed steam-tight upper section, each section being adapted to hold a quantity of water in their lower portions; an inverted U-shaped overflow pipe having its ends respectively terminating adjacent the bottoms of the respective sections; a collar within the upper section extending upwardly from the bottom thereof to a point above the normal water level therein and communicating with the lower section; a valve on said collar adapted to be opened and closed by the rise and fall of the water in the upper section; means within the lower section for holding the products to be extracted; and devices operable by the rise and fall of liquid in the sections for controlling the control devices of the heater.

14. In a brewer as set forth in claim 13, said devices comprising a pair of electrical contacts adapted to be connected in the control circuit of the heater, the movable contact being mounted on the valve, and the fixed contact being fixedly mounted in the upper section.

15. In a brewer as set forth in claim 13, said devices comprising a float adapted to rise and fall with the water in the lower section; a rod connected with the float; a ratchet wheel; a spring-pressed pawl on said rod adapted to rotate the ratchet wheel one tooth on each upward movement of the rod and to yield past the following tooth on each downward movement of the rod; a fixed contact connected in the control circuit of the heating means; and a movable contact connected in the control circuit and carried by the ratchet wheel adapted to engage the fixed contact whereby the contacts will be engaged after a predetermined number of successive movements of the ratchet wheel.

16. In a brewer as set forth in claim 13, said devices comprising a liquid gauge mounted on the lower section and communicating with the interior thereof; a float in said gauge; a rod entering the upper end of the gauge and connected with the float; a ratchet wheel mounted on the lower section above the gauge; a spring-pressed pawl on said rod adapted to rotate the ratchet wheel one tooth on each upward movement of the rod and to yield past the following tooth on each downward movement of the rod; a fixed contact connected in the control circuit of the heating means; and a movable contact connected in the control circuit and carried by the ratchet wheel adapted to engage the fixed contact, whereby the contacts will be engaged after a predetermined number of successive movements of the ratchet wheel.

17. In a brewer as set forth in claim 13, said lower section having a spout on its side communicating with the interior thereof, and said upper section having an apron overlapping the lower section and normally closing communication between the spout and interior of the lower section; said apron having an opening adapted in one position of the upper section on the lower section to establish communication therebetween.

18. In a brewer as set forth in claim 13, said valve comprising an inverted cup-shaped member slidably mounted on the said collar and carrying a float at its lower end; said member having perforations therein adjacent its upper end adapted to be closed by the walls of the collar when the valve is in lowered position.

19. In a brewer as set forth in claim 13, said product holding means comprising one or more screens disposed within the lower section.

20. In a brewer as set forth in claim 13, said product holding means comprising a container removably disposed in the overflow pipe within the lower section, said container being open at each end; and screens within the container between which the product is confined.

NORMAN G. BAKER.